Figure 1A:
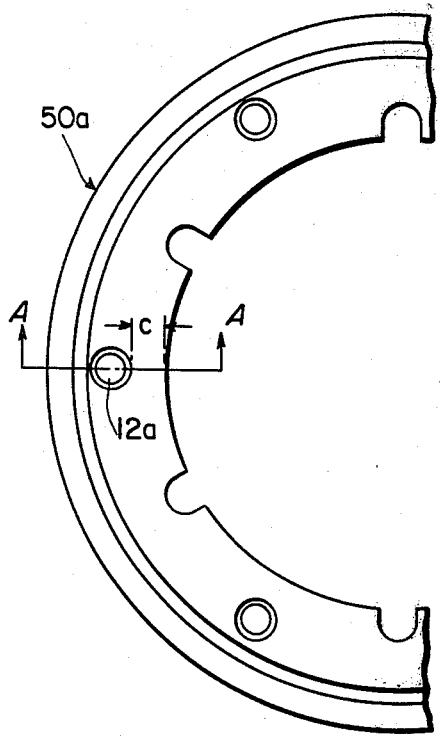

United States Patent [19]

Derendorf et al.

[11] 4,340,188
[45] Jul. 20, 1982

[54] WINDING HUB FOR MATERIALS IN STRIP FORM

[75] Inventors: Walter Derendorf, Heidelberg; Manfred Huber, Oberkirch, both of Fed. Rep. of Germany

[73] Assignee: BASF Aktiengesellschaft, Ludwigshafen, Fed. Rep. of Germany

[21] Appl. No.: 192,700

[22] Filed: Oct. 1, 1980

Related U.S. Application Data

[63] Continuation of Ser. No. 20,459, Mar. 14, 1979, abandoned.

[30] Foreign Application Priority Data

Apr. 6, 1978 [DE] Fed. Rep. of Germany ... 7810193[U]

[51] Int. Cl.³ .................................. B65H 75/18
[52] U.S. Cl. ........................... 242/68.5; 206/394; 206/509
[58] Field of Search ............ 242/68.5, 71.8, 118.3, 242/118.31, 118.32, 118.41; 206/389, 391, 394, 503, 509, 512

[56] References Cited

U.S. PATENT DOCUMENTS

| 3,153,519 | 10/1964 | Jewell et al. | 242/118.41 X |
| 3,508,719 | 4/1970 | Browning | 242/71.8 |
| 3,836,090 | 9/1974 | Mix | 242/68.5 |
| 4,081,151 | 3/1978 | Ender et al. | 242/68.5 |

FOREIGN PATENT DOCUMENTS

| 45517 | 10/1963 | Fed. Rep. of Germany . |
| 1372231 | 10/1974 | United Kingdom . |

*Primary Examiner*—John M. Jillions
*Attorney, Agent, or Firm*—Keil & Witherspoon

[57] ABSTRACT

An annular flangeless winding hub for strip materials which is stackable due in particular to its plate form that is produced by an appropriately shaped circular projection and depression. As additional locking means protrusions and recesses may be provided in the depression and in the projection respectively. Apart from asymmetrical embodiments, a symmetrical design with respect to the median plane of the winding hub can be achieved by the use of upwardly and downwardly protruding ridge members which fit into one another when a plurality of hubs are stacked one upon the other. Such a winding hub can be used for any kind of material having a ribbon-like configuration, such as magnetic tape, strips of film and punched paper tape.

4 Claims, 4 Drawing Figures

WINDING HUB FOR MATERIALS IN STRIP FORM

This application is a continuation of copending patent application Ser. No. 020,459, filed Mar. 14, 1979, now abandoned.

The present invention relates to an annular flangeless winding hub for materials in strip form, particularly magnetic tapes, consisting essentially of a cylindrical ring whose outer peripheral surface is the winding surface for the strip(s) and which is provided with projections and depressions, so that a plurality of winding hubs can be stably stacked above one another.

Magnetic tapes, e.g. those having a width of 3.81 mm which are intended for example for the production of pre-recorded compact cassettes, are preferably wound on flangeless NARTB winding hubs according to published German Standard Specification (DIN) 45,517. The hub serves as support for the magnetic tape during the final winding operation following slitting, and during transportation and processing; the inner peripheral surface of the winding hub is provided with three grooves, spaced 120° apart, which are engaged by drive pins on the hub support and clamping mechanism of the tape recorder, a positive connection between the reel and the driving means of the recorder thus being obtained. Because the overall height of the standard NARTB hub is 8.9 mm to accommodate magnetic tape 6.3 mm in width, such a hub is not an optimal support for a reel of 3.81 mm wide tape because, when several reels are stacked above one another, gaps are formed between adjacent reels of tape so that they cannot be transported safely. As a result, appropriately shaped interlayers have to be employed or each tape reel has to be placed in a trough-shaped container which greatly increases the volume of the unit to be packed, and has to be disposed of by the tape user.

It is known from British Pat. No. 1,372,231 that winding hubs having a single flange can be provided with locating means in the form of projections and depressions to enable a plurality of winding hubs to be stacked one upon the other and to prevent relative lateral movement of the stacked hubs. Because these locating means are arranged on the outer edge of the hub, the wound strip of material adjacent to the hub is trapped by the suprajacent hub, which, in the case of a magnetic tape, inevitably results in damage thereto. Although the flange does away with one of the abovementioned interlayers, it increases the cost of manufacture of the spool and the size of the package.

Furthermore, U.S. Pat. No. 4,081,151 discloses a flangeless winding core for magnetic tapes which exhibits lugs of the same dimensions extending alternately upwardly and downwardly from the median plane of the winding core, so that a plurality of cores can be stacked on top of one another and cannot rotate with respect to each other. Because such a core is not flat when viewed from the side, it cannot be clamped on the tape recorders usually used in duplicating apparatus without a special adapter. Since, moreover, the winding surfaces of two stacked cores lie directly next to one another and the width of the winding surface is the same as or only slightly larger than the width of the tape, there is a risk of the tape being jammed between the outer edges of the cores, as explained above.

It is an object of the present invention to provide a winding core which does not have the said disadvantages, can be used with advantage on tape winding machines and duplicating apparatus, and is easy to handle.

This object is achieved with an annular flangeless winding hub for materials in strip form, particularly magnetic tape, consisting essentially of a cylindrical ring comprising an outer peripheral surface and lateral surfaces, the peripheral surface acting as winding surface for the strip(s), and means being provided on the lateral surfaces for the interlocking of a plurality of winding hubs stacked above one another, wherein the said means comprise a circular projection on at least one of the lateral surfaces of the cylindrical ring, and an appropriately shaped depression for receiving the circular projection of another winding hub of similar construction.

In a practical embodiment of the invention, the projection and depression are arranged near the inner peripheral surface of the annular winding hub, which greatly reduces the risk of tape being jammed between adjacent hubs.

In an advantageous embodiment of the invention, the projection on the winding hub has a plate-shaped contour. Preferably, both the projection and the depression have a plate-shaped contour; this design ensures particularly stable stacking of a plurality of winding hubs.

In yet another embodiment of the invention, protrusions and recesses are provided in addition to the circular projection and depression to prevent the rotation of two or more stacked winding hubs relative to one another. For strength reasons these protrusions and recesses are advantageously in the form of ribs and grooves, the protrusions being arranged in the circular depression and the recesses in the circular projection.

In an even further embodiment, the circular depression and projection each have a substantially flat region which is free of protrusions and recesses and extends outwardly from the inner peripheral surface of the cylindrical ring, so that the winding hub can be mounted on the drive shaft in a desired plane.

The inner peripheral surface of the winding hub is advantageously provided with three or six equidistantly spaced grooves to facilitate clamping of the winding hub on an appropriately shaped drive shaft.

In a further advantageous embodiment of the invention, circular ridge members which are arranged concentrically with the axis of rotation of the winding hub and in staggered relationship to one another project upwardly and downwardly respectively from the lateral surfaces of the hub.

As a result of this design, when a plurality of hubs are stacked above one another the lower circular ridge member of larger diameter of one hub fits over the upper circular ridge member of smaller diameter of another hub. When each circular ridge member (referred to above as projection) is of the same height above the lateral surface of the winding hub, an advantageous symmetrical arrangement with respect to the median plane of the hub is obtained.

Figure 1B:
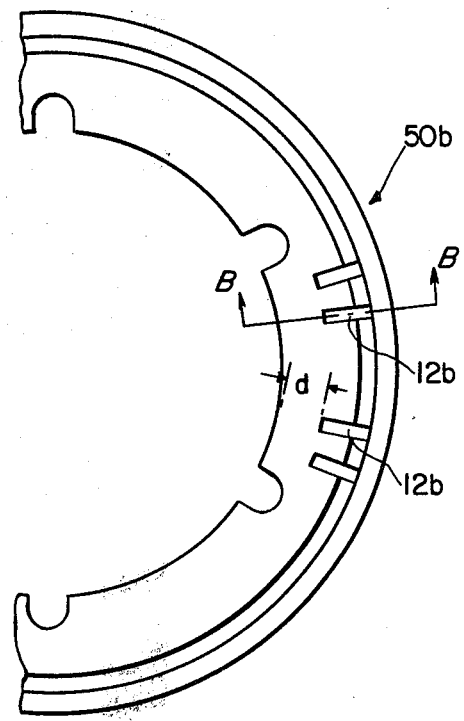
Figure 2A:
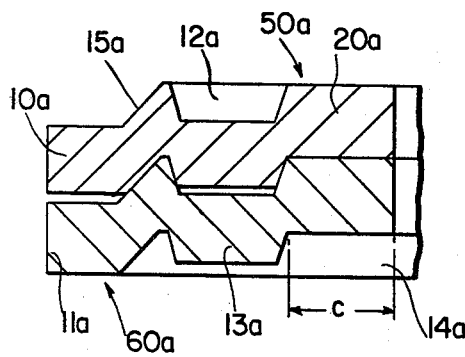
Figure 2B:
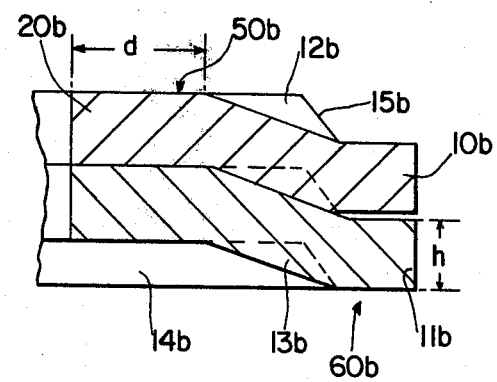

Further details of the invention are disclosed in the following description of the embodiments of the winding hub illustrated in the accompanying drawing, in which FIGS. 1a and 1b show schematically in plan view approximately the halves of two different winding hub designs, and FIGS. 2a and 2b are schematic cross-sectional views of the winding hubs of FIGS. 1a and 1b, taken along the lines A—A and B—B respectively, two hubs being stacked above one another in each case.

The winding hubs of FIGS. 1 and 2 have dimensions which are essential according to DIN 45,517 for processing 3.81 mm wide magnetic tapes for example, e.g. with respect to the internal and external diameters and the position and shape of the grooves for receiving the drive pins.

Schematically the winding hub is a cylindrical ring 50a or 50b which however comprises two rings, the winding ring 10a or 10b and the supporting ring 20a or 20b, both of which rings may have the shape of a cylindrical ring.

The outer peripheral surface 11a or 11b of the winding ring 10a or 10b forms the winding surface whose width is advantageously larger than the width of the magnetic tape.

The winding ring 10a or 10b is advantageously arranged relative to the supporting ring 20a or 20b in such a way that the reel of tape is at the same distance from the support surface (on the tape recorder) as a reel of tape wound in the middle of a standard NARTB hub. The portions of the NARTB hub according to DIN 45,517 projecting beyond the lateral surfaces of the tape reel may be dispensed with, so that the overall height of the hub is 6.5 mm and consequently material—and thus weight—is saved. However, if one is prepared to put up with the larger amount of material required and hence with the increase in volume of the hub, it is also possible to increase the width of the winding surface to such an extent (in the case under discussion by about 2.4 mm) that the standard height of the NARTB hub of 8.9 mm is obtained.

It is advantageous for the width of the winding surface to be appreciably larger, e.g. at least 5 to 10% larger, than the standard tape width, so that variations in tape width and manufacturing tolerances of the hubs cannot result in tape damage due for example to the tape being jammed between adjacent hubs.

The supporting ring 20a, 20b has for example a total of six grooves for receiving the drive pins on the duplicating machines, etc., and protrusions 13a or 13b and recesses 12a or 12b which prevent lateral movement and rotation of the loaded hubs. However, three grooves may be provided, as laid down in DIN 45,517. The protrusions on the lower surface of the supporting ring 20b in one embodiment of the hub 50b are in the form of pairs of ribs 13b that are arranged radially in the depression 14b and are triangular in shape, when viewed from the side, and of trapezoidal cross section, which ribs snugly fit in grooves 12b in projection 15b, the mean width of the grooves 12b corresponding to the mean distance between the outwardly facing sides of the ribs. The arrangement and number of pairs of ribs and grooves are so selected that two suprajacent hubs 50b interlock after they have been rotated in either direction through an angle of 15°. It is however also possible to entirely dispense with any kind of protrusion and recess.

In another hub design 50a the supporting ring 20a is provided with conical or conical frustum-shaped lugs 13a instead of ribs, and with appropriately shaped complementary recesses 12a instead of grooves, in order to prevent lateral movement and rotation of stacked hubs. The lugs 13a can in principle also be pyramid-shaped or the shape of a truncated pyramid or in the form of prismatic protrusions of any desired shape, provided that they snugly fit in the recesses in the projection 15a.

The above design features enable a much larger number of loaded hubs to be packed in existing containers, as a result of which much less room is taken up in warehouses and the like. The cost of the package itself can be reduced and packing times can be cut. The absence of the thick interlayers or foamed trough-shaped containers means for the user that there is no waste to dispose of, which is sometimes expensive.

Suitable plastics materials or metal alloys may be used as material of construction for the winding hub. The hubs can be manufactured advantageously and very economically by molding or casting, depending on the material used.

Another feature of the hub design has not been discussed hitherto, namely the mounting of the hub on the cutting or winding machine or duplicating apparatus after the drive shaft has entered the axial hole in the hub.

The clamping device consists essentially of a cylindrical member which is placed over the winding hub and tightened down.

The hub must be clamped on the shaft in a predetermined plane, i.e. at right angles to the longitudinal axis of the shaft, because a winding operation in which the strip or tape has to be wound or unwound in a specific position is subsequently carried out. This is the reason why a substantially flat region is provided on the circular depression next to the protrusions 13a or 13b and on the circular projection, these regions being designated c and d in FIGS. 1 and 2. "c" is the region between the inner rim of the hub 50a and the beginning of the protrusion 13a, i.e. it is in the depression 14a in the ring, whereas "d" is the flat region on the projection 15b, i.e. on the base of the plate-shaped hub. These regions c and d are advantageously free of protrusions, i.e. even, so that the hub can be mounted flat on the receiving member on the drive shaft without an adapter having to be additionally used and without any warping thereof being effected by the clamping means on the tape recorder. As will be clear from FIGS. 2a and 2b of the drawings as well as from the above description, the aforementioned regions c and d then form inner ledges which extend flat over the entire circumference in planes parallel to the median plane of the annular portion 20a, 20b of the hub, which is immediately adjacent to the inner peripheral surface and, by the same token, parallel to the median plane of the winding surface of the hub. As can be seen from the drawing, the protrusions 13a and ribs 13b respectively are arranged very near to and directly on the inclined edge of the plate-shaped hub. It is of course also possible to use ribs of rectangular cross section which extend for example from the inclined edge to the inner rim of the hub 50b. Provided that an appropriate number of such ribs are present (at least 4 arranged symmetrically with respect to a diameter), the hub can also be mounted flat on the receiving member. This design is also intended to be covered by the expression "substantially flat region".

FIG. 2 shows hub 50a or 50b in cooperative mating engagement with another hub 60a or 60b of similar construction. Corresponding parts in FIGS. 1a and 2a and 1b and 2b bear the same reference numerals, the letters a and b being used respectively.

In a further hub design not shown in the drawings, upwardly and downwardly projecting circular ridge members are provided which are of different diameter and hence engage one another when one hub is stacked on top of another one. When each circular ridge member is of the same height above the lateral surface of the winding hub, an advantageous symmetrical arrangement with respect to the mediam plane of the hub is obtained.

A large variety of other mating hub designs which prevent lateral movement of a plurality of stacked hubs relative to one another are also conceivable without departing from the spirit and scope of the invention.

We claim:

1. An annular flangeless winding hub for magnetic tape, comprising a substantially cylindrical ring having an outer peripheral surface, an inner peripheral surface, and lateral surfaces, the outer peripheral surface serving as the winding surface for the tape and the lateral surfaces being configured to provide for the interlocking of a plurality of winding hubs of similar construction when stacked upon each other, wherein the median plane of the annular portion of said cylindrical ring immediately adjacent said inner peripheral surface is laterally spaced from the median plane of said winding surface so that one of the co-planar lateral faces of said portion forms a projection while the other face forms a generally complementary depression, said co-planar faces forming respective inner ledges estending flat over their entire circumference in planes parallel to said median planes, to facilitate the mounting of said winding hub for rotation and said projection on one winding hub cooperating with said depression on another winding hub to provide for said interlocking when said hubs are stacked one upon the other, and wherein in the radially outer regions of said portion protrusions and recesses are provided to prevent the rotation of two or more stacked winding hubs relatively to each other.

2. An annular winding hub as claimed in claim 1, wherein said protrusions are provided in the depression of said portion and said recesses in the projection of said portion.

3. An annular winding hub as claimed in claim 1 or 2, wherein said protrusions and recesses are in the form of radial ribs and grooves.

4. An annular winding hub as claimed in claim 1 or 2, wherein said protrusions and recesses are in the form of lugs and holes.

* * * * *